Patented June 11, 1946

2,402,066

UNITED STATES PATENT OFFICE 2,402,066

5-ARYLCARBAMYL 2-MERCAPTOTHIAZOLES

Roger A. Mathes, Akron, Ohio, assignor to The B. F. Goodrich Company, New York, N. Y., a corporation of New York No Drawing. Application March 10, 1945, Serial No. 582,167

11 Claims. (Cl. 260—302)

This invention relates to new compositions of matter and more specifically to 5-arylcarbamyl substituted 2-mercaptothiazoles.

Types of substituted mercaptothiazoles disclosed by prior art include alkyl, aryl and carbalkoxy substituted mercaptothiazoles. Among other properties, these new compounds are active accelerators of vulcanization.

The new compounds of this invention are 5-arylcarbamyl substituted mercaptothiazoles, which can be prepared by reacting ammonium dithiocarbamate with an aryl amide of an alpha halo substituted beta-ketonic acid, having the following general formula:

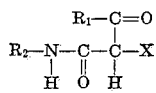

where $R_1$ is a hydrocarbon group such as an alkyl group or an aryl group; $R_2$ is an aryl group; and X is halogen. The reaction probably takes place according to the following equation, where the aryl amide of the alpha halo substituted beta-ketonic acid is shown to react in its enol form:

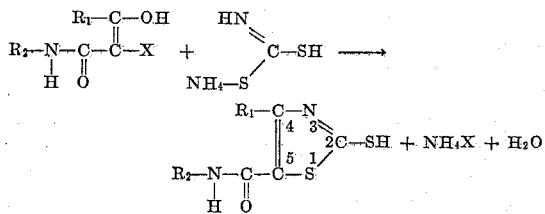

where $R_1$, $R_2$ and X retain their identity as above. As is indicated by the reaction equation, 2-mercaptothiazoles can be produced having aryl or alkyl substitution in the 4 position as well as arylcarbamyl substitution in the 5 position. These reactions may be carried out either in the absence or in the presence of water or any of the organic solvents commonly used as reaction diluents, such as ethers, alcohols, benzene and the like.

These alpha halo beta-ketonic acid arylamides are made by reacting an arylamine with an alpha halo beta-ketonic acid ester. This synthesis as well as the synthesis of the alpha halo compound is described in the literature which is concerned with the synthesis of organic compounds.

These arylcarbamyl substituted mercaptothiazoles are useful as accelerators and activators of vulcanization of rubber, although they may also be used as insecticides, fungicides, etc. Among the rubbers with which my new compounds may be used are all varieties of natural rubber, such as caoutchouc, balata, gutta-percha, latex, reclaimed rubber, and such synthetic rubbers as can be vulcanized with sulfur, such as polymers of 1,3-butadiene, isoprene, 2,3-dimethyl 1,3-butadiene, piperylene, and the like, and copolymers of these compounds with acrylonitrile, styrene methyl acrylate, methyl methacrylate, isobutylene, and other copolymerizable monomers. These new compounds may be added to the rubber on a roll mill or in internal mixer or by any other suitable method. Other compounding ingredients, such as any of the ordinary pigments, fillers, dyes, antioxidants, or other accelerators of vulcanization may be employed together with my new compounds. Small quantities may be used to achieve the desired results, either as a vulcanization activator or accelerator. In general 0.1 to 5% or more, based on the rubber composition, may be used, along with similar quantities of sulfur or of sulfur donors, or even more if a hard rubber product is desired.

The following specific examples will serve more fully to illustrate the preparation of my new compounds.

4.2 grams (0.02 gram molecular equivalents) of alpha-chloroacetoacetanilide, 2.3 grams (0.02 gram molecular equivalents) of ammonium dithiocarbamate, and 50 ml. of ether are added to a reaction flask fitted with a reflux condenser. The reaction mixture is warmed to 35° C. and the ether is allowed to reflux for 5 minutes after which time there is added 25 ml. more ether. The orange-brown precipitate that forms is filtered off and dried. The ether filtrate is evaporated and the residue added to the filtered product. This combined product is washed twice in water, filtered and dried. The dried product weighs 4.8 grams which represents a yield of 98%. This product had a melting point of 255–58° C. The crystalline product when purified by dissolving in sodium hydroxide, filtering the solution, reprecipitating with acid, and recrystallizing twice from alcohol is a tan colored crystalline material having a melting point of 265–66° C. The chemical analysis below of the product shows it to have a composition in agreement with the formula:

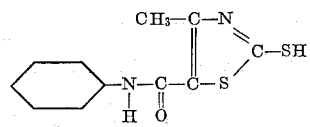

*Chemical composition*

| Chemical elements | Calculated from formula, per cent | From chemical analysis, per cent |
|---|---|---|
| $C_{11}$ | 52.8 | 52.8 |
| $H_{10}$ | 4.0 | 4.38 |
| $N_2$ | 11.2 | 10.69 |
| $S_2$ | 25.6 | 24.87 |
| $O_1$ | 6.4 | 7.25 |

The produce may accordingly be named 2-mercapto 4-methyl 5-phenylcarbamyl thiazole.

The arylamides derived from the reaction of alpha chloro acetoacetic esters with ortho-toluidine, para-toluidine, 4-meta-xylidene, 4-cumidine, ortho-anisidine, para-anisidine, meta-aminophenol, alpha naphthylamine, beta naphthylamine, and the like can be substituted in the above reaction for the anilide to produce corresponding 2-mercapto 4,5-substituted thiazoles.

It is not necessary to limit the reaction to the alpha chlorinated compounds, for the alpha brominated compounds will react with ammonium dithiocarbamate just as satisfactorily as the chloro compounds. In general any arylamide of an alpha halogenated beta-ketonic acid may be used in my invention, and will react to produce an arylcarbamyl substituted mercaptothiazole.

As indicated above, substitution in the 4 position in the thiazole ring can be varied by using, in place of the amide of alpha chloroacetoacetic acid, an arylamine salt of a homologous acid, such as propioacetic acid, butyroacetic acid, heptoacetic acid, decoylacetic acid, and the like. Thus, the reaction of alpha chloropropioacetanilide with ammonium dithiocarbamate produces a 2-mercapto 4-ethyl 5-phenylcarbamyl thiazole.

The above examples merely indicate the scope of this invention. It is evident that the substitution in the 4 and 5 positions of the thiazole ring of 2-mercaptothiazole is only limited by the beta-ketonic acids that can be made and by the arylamines which will form amides of the acids.

As an indication of the ability of my new compounds to accelerate the vulcanization of rubber, the following example illustrates the effect produced in a rubber by 4-methyl 5-phenylcarbamyl 2-mercaptothiazole. A typical "high gum" stock of the following composition, in which the parts are by weight, was prepared.

| | Parts |
|---|---|
| Natural rubber | 100 |
| Zinc oxide | 5 |
| Sulfur | 3.5 |
| Stearic acid | 1.0 |
| 2 - mercapto 4 - methyl 5 - phenylcarbamyl thiazole | 1.0 |

After vulcanization at 287° F., the composition had the physical properties as shown in the following table, in which T is the ultimate tensile strength in lb./sq. in. and E is the ultimate elongation in percent.

| Time of vulcanization in minutes | T | E |
|---|---|---|
| 15 | 2,630 | 895 |
| 30 | 3,090 | 805 |
| 60 | 3,420 | 780 |
| 120 | 2,390 | 810 |

The above composition vulcanized without a vulcanization accelerator would require 3 or more hours for vulcanization and would have a tensile strength of only about 1800 to 2000 lb./sq. in.

Equally as good results may be achieved by employing other 2-mercapto 5-arylcarbamyl substituted thiazoles as accelerators of the vulcanization of rubber.

While I have herein disclosed specific examples of this new class of 2-mercapto 5-substituted thiazoles, I do not thereby desire or intend to limit myself solely thereto, for, as hitherto stated, the precise portions of the reactants used may be varied and materials having equivalent chemical properties may be employed, if desired, without departing from the spirit and scope of the invention as defined in the appended claims.

I claim:

1. A process for preparing 2-mercapto 4-alkyl 5-arylcarbamyl thiazoles which comprises reacting ammonium dithiocarbamate with an arylamide of a beta-ketonic acid having a hydrogen atom and a halogen atom attached to the alpha carbon atom.

2. A process for preparing 2-mercapto 4-alkyl 5-arylcarbamyl thiazoles which comprises reacting substantially equimolecular portions of ammonium dithiocarbamate with an arylamide of a beta-ketonic acid having a hydrogen atom and a halogen atom attached to the alpha carbon atom.

3. A process for preparing 2-mercapto 4-alkyl 5-arylcarbamyl thiazoles which comprises reacting ammonium dithiocarbamate with an arylamide of a beta-ketonic acid having a hydrogen atom and a chlorine atom attached to the alpha carbon atom.

4. A process for preparing 2-mercapto 4-alkyl 5-arylcarbamyl thiazole which comprises reacting substantially equimolecular portions of ammonium dithiocarbamate with an arylamide of a beta-ketonic acid having a hydrogen atom and a chlorine atom attached to the alpha carbon atom.

5. A process for preparing 2-mercapto 4-methyl 5-arylcarbamyl thiazole which comprises reacting ammonium dithiocarbamate with an arylamide of alpha-chloroacetoacetic acid.

6. A process for preparing 2-mercapto 4-methyl 5-arylcarbamyl thiazole which comprises reaching substantially equimolecular portions of ammonium dithiocarbamate with an arylamide of alpha-chloroacetoacetic acid.

7. A process for preparing 2-mercapto 4-methyl 5-phenylcarbamyl thiazole which comprises reacting ammonium dithiocarbamate with alpha-chloroacetoacetanilide.

8. A process for preparing 2-mercapto 4-methyl 5-phenylcarbamyl thiazole which comprises reacting substantially equimolecular portions of ammonium dithiocarbamate with alpha-chloroacetoacetanilide.

9. A 2-mercapto 4-alkyl 5-arylcarbamyl thiazole having the formula

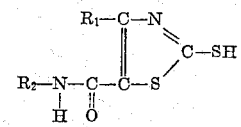

where $R_1$ is an alkyl group and $R_2$ is an aryl group.

10. A 2-mercapto 4-methyl 5-arylcarbamyl thiazole having the formula

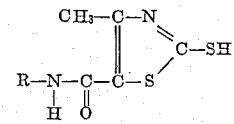

where R is an aryl group.

11. 2 - mercapto 4 - methyl 5 - phenylcarbamyl thiazole having the formula

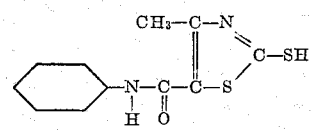

ROGER A. MATHES.